(12) United States Patent
Zigelboim et al.

(10) Patent No.: US 10,396,971 B2
(45) Date of Patent: Aug. 27, 2019

(54) ONE-WAY PACKET DELAY MEASUREMENT

(71) Applicant: RAD DATA COMMUNICATIONS LTD., Tel Aviv (IL)

(72) Inventors: Gabriel Zigelboim, Tel Aviv (IL); Alon Geva, Hod Ha'sharon (IL); Yaakov Stein, Jerusalem (IL)

(73) Assignee: RAD DATA COMMUNICATION LTD., Tel Aviv (IL)

(*) Notice: Subject to any disclaimer, the term of this patent is extended or adjusted under 35 U.S.C. 154(b) by 161 days.

(21) Appl. No.: 15/728,519

(22) Filed: Oct. 10, 2017

(65) Prior Publication Data
US 2018/0152281 A1 May 31, 2018

Related U.S. Application Data

(62) Division of application No. 15/361,517, filed on Nov. 28, 2016, now Pat. No. 9,787,461.

(51) Int. Cl.
*H04L 7/00* (2006.01)
*H04L 12/26* (2006.01)
*H04J 3/06* (2006.01)

(52) U.S. Cl.
CPC .......... *H04L 7/0012* (2013.01); *H04L 7/0004* (2013.01); *H04L 43/062* (2013.01); *H04L 43/0858* (2013.01); *H04L 43/0864* (2013.01); *H04L 43/106* (2013.01); *H04J 3/0667* (2013.01)

(58) Field of Classification Search
CPC ....... H04L 7/00; H04L 7/0004; H04L 43/106; H04L 12/2663
See application file for complete search history.

(56) References Cited

U.S. PATENT DOCUMENTS

| | | | | |
|---|---|---|---|---|
| 8,982,777 B1* | 3/2015 | Pearson | ............. | H04W 56/001 370/324 |
| 9,787,461 B1* | 10/2017 | Zigelboim | ............ | H04L 7/0004 |
| 2003/0048811 A1* | 3/2003 | Robie, Jr. | ............. | H04J 3/0667 370/509 |
| 2007/0116057 A1 | 5/2007 | Murphy et al. | | |

(Continued)

OTHER PUBLICATIONS

International Search Report and Written Opinion dated Mar. 22, 2018 for application No. PCT/IL2017/051295 filed Nov. 28, 2017.

*Primary Examiner* — Christopher M Crutchfield
(74) *Attorney, Agent, or Firm* — A. C. Entis—IP Ltd.; Kenichi N. Hartman; Allan C. Entis

(57) ABSTRACT

A method for measuring one-way delays in a communications network, the method comprising: maintaining, at a third node having a reference clock, a first virtual clock state emulating a first node clock located at a first node and a second virtual clock state emulating a second node clock located at a second node; registering a timeset comprising transmission and reception times at the first node and the second node, respectively, for each packet of a plurality of packets that are transmitted from the first node to the second node and reflected from the second node back to the first node; converting times in the timeset, responsive to the first and/or second virtual clocks, into times in accordance with the reference clock; calculating, for each packet of the plurality of packets, a forward one-way delay (FOWD) and a reverse one-way delay (ROWD), responsive to the converted timeset.

12 Claims, 4 Drawing Sheets

(56) References Cited

U.S. PATENT DOCUMENTS

| | | |
|---|---|---|
| 2011/0134766 A1 | 6/2011 | Zampetti et al. |
| 2012/0275317 A1 | 11/2012 | Geva et al. |
| 2013/0039359 A1 | 2/2013 | Bedrosian |
| 2013/0100948 A1 | 4/2013 | Irvine |
| 2014/0056318 A1* | 2/2014 | Hansson ............... H04J 3/0667 370/503 |
| 2015/0092794 A1 | 4/2015 | Aweya et al. |

* cited by examiner

ONE-WAY PACKET DELAY MEASUREMENT

RELATED APPLICATIONS

This application is a divisional of U.S. application Ser. No. 15/361,517 filed on Nov. 28, 2016 and to be issued as U.S. Pat. No. 9,787,461 on Oct. 10, 2017, the disclosure of which is incorporated herein by reference.

TECHNICAL FIELD

Embodiments of the disclosure relate to measuring one-way data packet transmission delay in a communications network.

BACKGROUND

Data transmission through a communications network is not instantaneous, and always involves a delay between time of transmission of a data packet at a source node and time of its reception at a destination node. It is useful to represent the delay experienced by a packet as the sum of two components, the floor delay (FD) and the queuing delay (QD). The floor delay is the minimum obtainable delay and is determined by physical features of the communications path from the source node to the destination node. The queuing delay, which results from a packet waiting in queues of network elements along the communications path, is dependent on the volume of packet traffic along the path. When a packet is "lucky" enough to traverse all nodes along its path with no queuing delay, its delay is solely the FD. Low levels of interfering traffic result in a small additional QD, while near-congestion levels of packet traffic result in increased queue residence times at one or more nodes traversed, thus increasing the QD component.

In some cases bidirectional packet traffic is co-routed, that is, if the packets sent from a first node to a second node follow a path that traverses some sequence of network elements and links, then packets sent from the second node to the first node follow a path that traverses the same network elements and links in reverse order. Needless to say, when bidirectional traffic is not co-routed, one can't say anything about packet delays in the two directions, as the packets traverse different numbers of nodes and different lengths of links. However, even when bidirectional traffic is co-routed, resulting in (at least approximately) identical FDs, the total packet delays may be different in the two directions due to different QDs resulting from different volumes of packet traffic in the opposing directions.

The packet delay we have been describing is said to be a one-way delay (OWD), that is, the time taken by a packet transmitted from a first node to traverse the network and arrive at a second node. This is in contrast to Round Trip Time (RTT), the time taken for a packet to travel from the first node to the second node, to be reflected by the second node and to return to the first node. OWD may be quantified as the difference between T2, the time of reception at the second node, and T1, the time of transmission from the first node. Accurate measurement of OWD is challenging because T1 is measured by a first clock situated at the first node (which we shall call the first node clock), while T2 is measured by a second clock situated at the second node (second node clock). Lack of synchronization between these two node clocks leads to inaccuracy of the measured OWD. In contrast, RTT can be measured more accurately, since both initial transmission time and final reception time are measured according to the same clock, namely the first node clock.

One method to accurately measure OWD involves synchronizing the two node clocks, e.g., by use of a packet a time distribution protocol such as Network Time Protocol (NTP) or Precision Time Protocol (PTP). For example, the second node clock may be synchronized to the first node clock, or both may be synchronized to a common reference clock.

An alternative method to achieve accurate OWD measurement utilizes a virtual clock. A virtual clock is an abstract entity that maintains all the information necessary to convert times as measured by a given clock into times that would have been measured by a reference clock. The virtual clock tracks packet transmission and reception times and performs the synchronization algorithms that in the previous method would have been performed at the communications node. The result of these algorithms is a "virtual clock state" that includes time-related values, such as frequency and time offsets, needed to perform conversions between times as seen by a node clock and times as seen by the reference clock.

SUMMARY

An aspect of an embodiment of the disclosure relates to providing a method for accurately measuring one-way delay for a communications path between a first node and a second node in a communications network, without requiring synchronization of node clocks. For convenience of presentation, the method in accordance with an embodiment of the disclosure may be referred to herein as Nonsynchronized Delay Measurement (NDM).

In a NDM method in accordance with an embodiment of the disclosure, to determine one-way delay, a source node transmits a plurality of delay measurement packets (DM packets) comprised in a delay measurement session (DM session) to a reflector node which reflects them back to the source node. DM packets may conform to one of known measurement packet formats, such as the Two-Way Active Measurement Protocol (TWAMP) or the delay measurement packets of ITU-T Recommendation Y.1731. Associated with the source node is a source node clock (which may be referred to herein as a SN clock), and associated with the reflector node is a reflector node clock (which may be referred to herein as a RN clock). In an embodiment of the disclosure, no independent synchronization is carried out between these two clocks. Optionally, no packet timing distribution protocol sessions, such as NTP or PTP sessions, are used before, during, or after the DM session to synchronize the source node clock and the reflector node clock.

The NDM method further comprises registering, for each packet, a set of transmission and reception times of the packet at the source and reflector nodes, respectively. This timeset typically comprises four times: $T1$, the time of transmission of the DM packet from the source node as measured by the source node clock; $T2'$, the time of reception of the DM packet at the reflector node as measured by the reflector node clock; $T3'$, the time of transmission of the DM packet from the reflector node as measured by the reflector node clock; $T4$, the time of reception of the DM packet at the source node as measured by the source node clock. These times are optionally inserted into the DM packet by the nodes involved.

In an embodiment of the disclosure the timeset is used to calculate an adjusted timeset in which all times are referenced to a single reference clock. In an embodiment of the disclosure, the source node clock may be designated to be the reference clock, and the NDM method may comprise maintaining a virtual clock state emulating the reflector node clock at the source node. With the source node clock as the reference clock, the DM packet of the DM session returns timestamps representing times T1, T2', T3', and T4, in which times T2' and T3' are converted to T2 and T3 responsive to the virtual clock state, in order to generate an adjusted timeset with times T1, T2, T3, T4 that all in accordance with the source node clock. Alternatively, the reflector node clock is designated to be a reference clock, the virtual clock state emulating the source node clock is maintained at the reflector node, and the aforementioned timeset with times T1, T2', T3', T4 may be converted into adjusted timeset T1', T2', T3', T4' with all times in accordance with the reflector node clock. Alternatively, the times may be converted to have an adjusted timeset with T1", T2", T3", T4" in accordance to a reference clock that is comprised in a reference node that is neither the source node nor the reflector node.

From an adjusted timeset, a forward one-way delay (FOWD) (the time for a packet to travel from the source node to the reflector node) may be calculated as T2−T1, and a reverse one-way delay (ROWD) (the time for a packet to travel from the reflector node to the source node) may be calculated as T4−T3. A RTT may be calculated as (T4−T1)−(T3−T2).

In an embodiment of the disclosure, RTT, the FOWD and/or the ROWD may be calculated for each DM packet in the DM session. The delay times may vary from packet to packet. The NDM method optionally comprises calculating statistics of these measurements, such as the average, minimum, maximum, standard deviation, and percentiles.

In an embodiment of the disclosure, the FOWD and the ROWD calculated for a given DM packet may be tested against a gating criterion to select a minimal FOWD or a minimal ROWD representing lucky one-way packets that traversed the path between the source node and the reflector node without a queuing delay. A minimal FOWD that passes the gating criterion may be used to update an estimate of the forward floor delay (FFD) characterizing the communication channel from the source node to the reflector node, and a minimal ROWD that passes the gating criterion may be used to update an estimate of the reverse floor delay (RFD) characterizing the communication channel from the reflector node to the source node. For co-routed paths, we may assume symmetry of the floor delays, that is FFD=RFD.

Once either the estimated FFD or RFD are updated and accurately known, one may estimate the time difference between the source node clock and the reflector node clock. In an embodiment of the disclosure, the estimated FFD and/or RFD are used as inputs to update a virtual clock state. Optionally, the FFD and/or RFD are updated periodically, and the virtual clock state is also periodically updated responsive to the periodically updated FFDs and RFDs. Optionally, the updated virtual clock state is used to recalculate the FOWD and ROWD.

Another aspect of an embodiment of the disclosure relates to providing a delay measurement apparatus operable to perform a NDM method in accordance with an embodiment of the disclosure. The apparatus in an embodiment of the disclosure comprises at least one port for receiving and/or transmitting packets, a local clock, at least one virtual clock emulating a remote clock, a memory, and a delay analysis engine operable to: convert, responsive to a state of the virtual clock, a timeset into an adjusted timeset in accordance with a reference clock; and calculate a FOWD and a ROWD responsive to the converted timeset. Optionally, the delay analysis engine is further operable to determine an estimated FFD and an estimated RFD responsive to the FOWD and the ROWD, respectively. Optionally, the delay analysis engine is further operable to update a state of the at least one virtual clock responsive to the estimated FFD and/or the RFD. Note that this delay measurement apparatus may work with any DM packet reflector conventionally used to measure RTT, and hence may be called a Reflector Agnostic Delay Measurement (RADM) apparatus.

Optionally, the delay analysis engine is operable to calculate statistics on values registered and/or calculated by the delay analysis engine, which may be one or more of times comprised in a timeset, a OWD, an estimated floor delay, or a state of a virtual clock.

Optionally, one or more of a timeset, adjusted timeset, FOWD, ROWD, FFD, and RFD are stored in the memory.

Optionally, the memory may store an instruction set for controlling operation of the delay analysis engine to perform one or more of the following in accordance with an embodiment of the disclosure: convert a timeset into an adjusted timeset, calculate a OWD, determine an estimated floor value, and update a virtual clock state.

Optionally, the RADM apparatus further comprises or is operatively connected to a user interface for reporting values registered and/or calculated by the delay analysis engine.

Optionally, the RAMD apparatus further comprises a packet source operable to generate and transmit the communications session packets. Optionally, the packet source is operable to generate and transmit conventional DM session packets.

In another embodiment of the disclosed method, we consider a source node with source node clock, a reflector node with reflector node clock, and a reference clock located at a third location, which may be referred to as a reference node. In this case we do not assume that the communications path between source node and reflector node is co-routed, and thus the floor delays FFD and RFD may be very different. On the other hand, we assume that there are co-routed paths from the reference node to the source node and to the reflector node. In an embodiment of the disclosure, the delay measurement apparatus is comprised in the reference node and comprises a reference clock, two virtual clocks, a first virtual clock emulating a source node clock and a second virtual clock emulating a reflector node clock. The state of each of the first and second virtual clocks are updated in accordance with the NDM method described herein above. For each DM packet of the DM session, times T1 as measured by the source node clock, T2' as measured by the reflector node clock, T3' as measured by the reflector node clock, and T4 as measured by the source node clock of timeset T1, T2', T3', T4 are sent to the reference node. In an embodiment of the disclosure, the first and second virtual clock states may be used to converted the times in the timeset to generate and adjusted timeset with times T1", T2", T3", and T4" that are all in accordance with the reference clock. With the adjusted timeset, FOWD may be estimated by T2"−T1" and the ROWD by T4"−T3", and the RTT by T4"−T1"−(T3"−T2"). For a given DM packet, one or more of the above measurements (FOWD, ROWD and RTT) may be used to calculate its respective average and/or other statistics. The conversion of times measured by the source node clock and/or times measured by the reflector node clock to be in accordance with the reference clock may be based on a state of the first virtual clock and/or a state of the second virtual clock.

Another aspect of an embodiment of the disclosure relates to providing a non-transient computer readable medium comprising executable instructions, which when executed causes an apparatus to perform a method for measuring one-way delays in a communications network in accordance with an embodiment of the disclosure.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Unless otherwise indicated, the word "or" in the description and claims is considered to be the inclusive "or" rather than the exclusive or, and indicates at least one of, or any combination of items it conjoins.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

Figure 1:
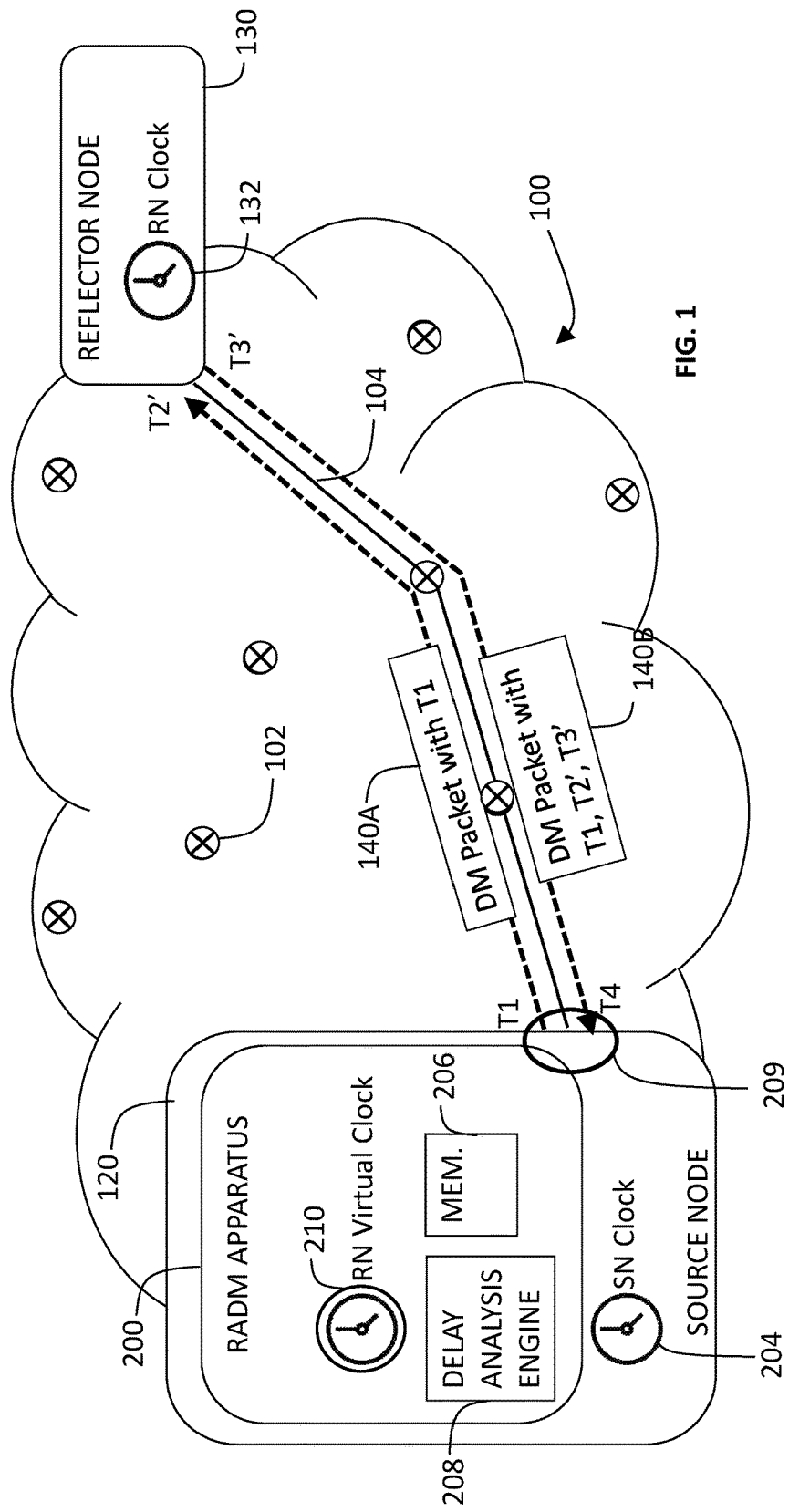
FIG. 1 shows a schematic illustration of DM packet exchange through a communications network between a source node comprising a RADM apparatus in accordance with an embodiment of the disclosure and a reflector node.

Reference is made to FIG. 1, which schematically illustrates a packet switched network (PSN) 100 in which an RADM apparatus 200 optionally located in, or connected to, a source node 120, and RADM apparatus 200 is shown engaging in a DM session with reflector node 130. Note that reflector node 130 may be a standard reflector node conventionally used to determine round-trip time RTT and need not know that it is participating in a one-way delay measurement. For this reason RADM apparatus 200 may be considered to be reflector agnostic.

Figure 2:
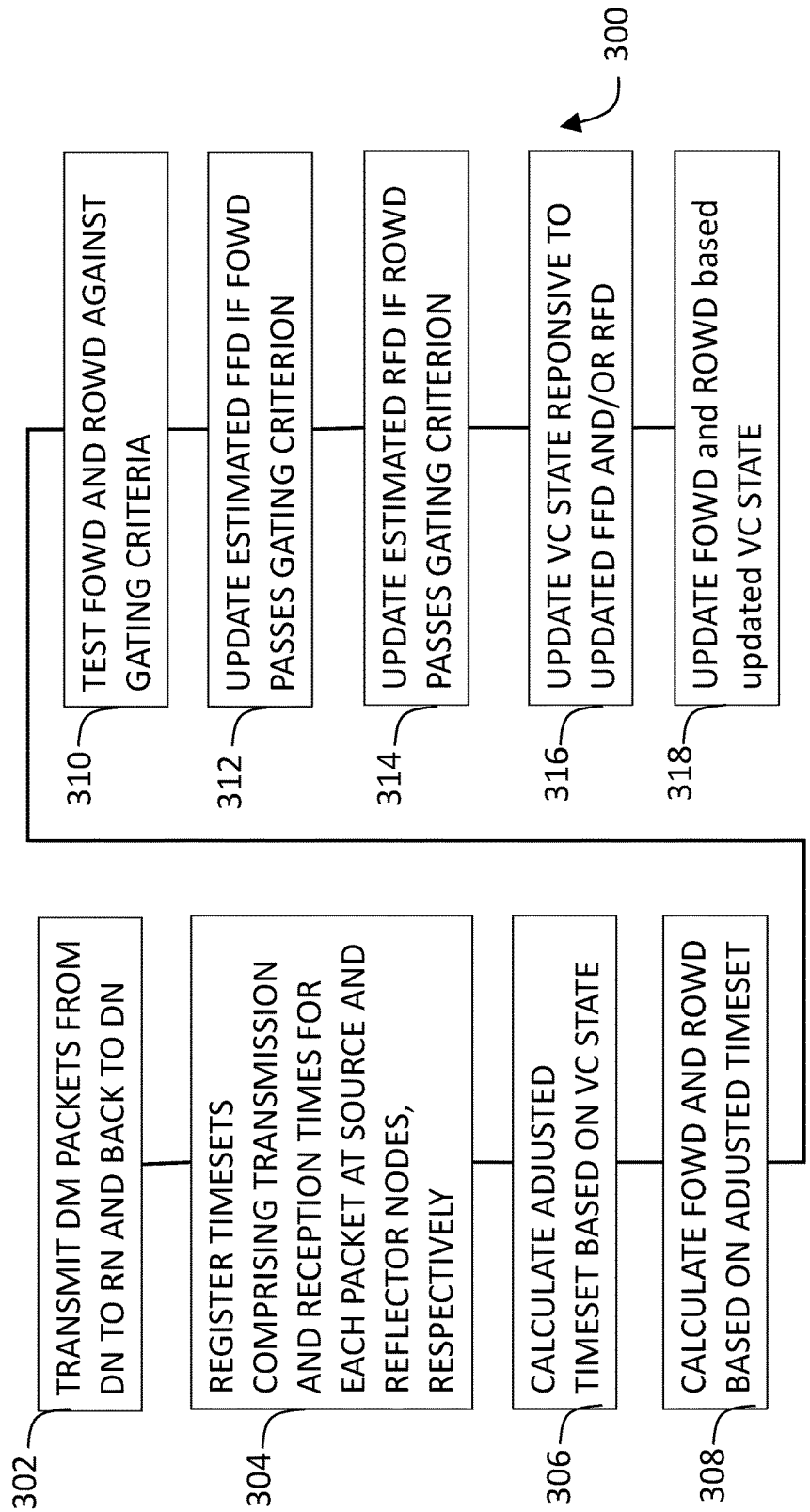
FIG. 2 shows a flowchart showing an NDM method in accordance of an embodiment of the disclosure wherein the virtual clock is collocated with the source node.

Reference is also made to FIG. 2, which shows a flowchart showing an NDM method 300 in accordance of an embodiment of the disclosure, which may be performed by RADM apparatus 200 during and/or following a DM session.

As shown in FIG. 1, RADM 200 in accordance with an embodiment of the disclosure comprises a memory 206, virtual clock 210, and delay analysis engine 208, whose functions will be described further hereinbelow. According to an embodiment of the disclosure, RADM 200 and its components may be located at source node 120. According to an embodiment of the disclosure, PADM 200 may comprise at least one port 209 for receiving and transmitting packets transmitted through PSN 100, for example DM packets exchanged between source node 120 and reflector node 130. Alternatively, one or more of the virtual clock, delay analysis engine, and memory may be located elsewhere in PSN 100.

In accordance with an embodiment of the disclosure, reflector virtual clock 210 maintains information required to convert times according to reflector node clock 132 located in reflector node 130 into times according to source node clock 204.

PSN 100 comprises an ensemble of nodes 102 and links connecting them. Among the nodes are source node 120 and reflector node 130. Solid line 104 represents a co-routed path from source node to reflector node to be taken by DM packets, schematically represented as rectangles 140.

During NDM procedure 300, DM packets 140 comprised in a DM session are exchanged through PSN 100 between source node 120 and reflector node 130 (block 302). Each DM packet 140 is transmitted from source node 120 to reflector node 130, which is then reflected back from reflector node 130 to source node 120. The reflected DM packet is optionally based on the DM packet 140 that was transmitted from source node 120, but with requisite swapping of source and destination addresses. Alternatively, a forward DM request packet transmitted from source node 120 terminates at reflector node 130, and reflector node 130 responds by transmitting a response DM packet back to source node 120. As shown in FIG. 1, DM packets 140 are co-routed between source node 120 and reflector node 130, such that if a forward DM packet 140A transmitted from source node 120 to reflector node 130 traverses communications path 104, then a reverse DM packet 140B transmitted from reflector node 130 to source node 120 traverses the same communications path 104 in the opposite direction.

In embodiments of the disclosure, the DM session may consist of a TWAMP session conforming to IETF RFC 5357, or an Ethernet OAM delay measurement session, conforming to ITU-T Recommendation Y.1731. These standards specify the format of DM packets and the procedures to be followed. It should be noted that any other format and procedures for sending packets and reflecting them back to source may be utilized.

In prior art embodiments, a conventional DM session typically requires packet time distribution sessions to additionally be carried out in order for OWD measurements derived from the DM session to be accurate. Such packet time distribution sessions may consist of NTP sessions conforming to IETF RFC 1305 or 5905, or to PTP sessions conforming to IEEE standard 1588. For example, a time distribution session may be carried out immediately before and immediately after the DM session, and the state of the virtual clock during the DM session may be determined by interpolation. It is noted that the NDM method in accordance with an embodiment of the invention enables both determination of OWDs as well as updating of one or more virtual clocks using packet timing information gathered in a single DM session. As such, a NDM method in accordance with an embodiment of the disclosure may advantageously enable a reduction or elimination of certain network maintenance sessions, by way of example, time distribution sessions.

NDM procedure 300 further comprises registering, for each DM packet, times of transmission and reception at source node 120 and reflector node 130 (block 304). In an embodiment of the disclosure, these times may be stored in memory 206 comprised in RADM apparatus 200.

Let the $n^{th}$ DM packet of a given session be expressed as Packet$_n$ (n=1 . . . N), N being the total number of DM packets in the DM session. The set of observed times for Packet$_n$ may be expressed as timeset TS$_n$.

Let times observed by source node clock 204 be expressed as $T_j$(j=1 . . . 4) and times observed by reflector node clock 132 be expressed as $T_j'$(j=1 . . . 4).

In an embodiment of the disclosure, timeset TS$_n$ for a given Packet$_n$ comprises four observed times [T1, T2', T3', T4]$_i$ in which:

T1 is a time of transmission from source node 120 according to its local clock, source node clock 204;

T2' is a time of reception by reflector node 130 according to its local clock, reflector node clock 132;

T3' is a time of reflected transmission from reflector node 130 according to reflector node clock 132; and T4 is a time of reception of the reflected packet by source node 120 according to source node clock 204.

In an embodiment of the disclosure, a DM packet 140A transmitted in a forward direction from source node 120 comprises T1, and a reflected DM packet 140B transmitted in a forward direction from reflector node 130 comprises T1, T2' and T3'. When packet 140B is received at source node 120, T4 is observed, and the timeset T1, T2', T3' and T4 may be recorded in memory 206. Optionally, DM packets does not comprise transmission and reception times, and source node 120 and reflector node 130 provide timesets to memory 206 for recordation through some other means.

In an embodiment of the disclosure, timeset TS$_n$ stored in memory 206 is processed by delay analysis engine 208. As described further below, delay analysis engine 208 may calculate one or more of the following for a DM session or DM packet Packet$_n$ in the DM session: an adjusted timeset; a FOWD (forward one-way delay); a ROWD (reverse one-way delay); an updated estimate of the FFD (forward floor delay); an updated estimate of the RFD (reverse floor delay); an updated state of reflector node virtual clock 210. Optionally, any or all of these may be stored in memory 206.

In an embodiment of the disclosure, NDM procedure 300 comprises adjusting the timeset TS$_n$ based on the state of reflector node virtual clock 210 (block 306). In an embodiment of the disclosure, the state of reflector node virtual clock 210 comprises a time correction (which may be referred to herein as $\Delta t$) for performing conversions between a time in accordance with source node clock 204 and a time in accordance with reflector node clock 132. From the timeset [T1, T2', T3', T4], time correction $\Delta t$ may be subtracted from times T2' and T3' measured by reflector node clock 132 in order to convert those times into T1 and T2 that are as if observed in accordance with source node clock 204. With the converted times, one obtains an adjusted timeset [T1, T2, T3, T4] comprising times in accordance with a single node clock (in this case source node clock 204). In an exemplary case, we may assume that the reflector node virtual clock 210 differs from the source node clock by an initial time offset and a constant frequency offset $\Delta f$, so that the time correction $\Delta t(t)$ for a given time t may be determined according to the formula $\Delta t(t)=\Delta t(0)+\Delta f\, t$. The time correction $\Delta t(t)$ may be subtracted from times measured with respect to the reflector node clock to obtain times as would be measured by the source node clock.

Obtaining the adjusted timesets may advantageously allow for accurate calculation of one-way delays because the times are converted as needed to have all the times be referenced to a single clock. NDM procedure 300 further comprises using the adjusted timeset to calculate one-way delays experienced by the $n^{th}$ DM packet, which may be in accordance with the following formulas: FOWD$_n$=T2$_n$–T1$_n$ for the $n^{th}$ DM packet to get from source node 120 to reflector node 130; and ROWD$_n$=T4$_n$–T3$_n$ for the $n^{th}$ DM packet to get from reflector node 130 to source node 120 (block 308).

As described above, T2' and T3' registered in accordance with reflector node clock 132 were converted to T2 and T3 in accordance with source node clock 204. Alternatively, the DM packet reception and transmission times in the time set may be adjusted to be in accordance with a same clock by converting T1 and T4 registered in accordance with source node clock 204 to T1' and T4' in accordance with reflector node clock 132, such that TS$_n$ comprising [T1, T2', T3', T4]$_n$ is converted to an adjusted timeset comprising [T1', T2', T3', T4']$_n$. Optionally, the timeset is adjusted based on the state of reflector node virtual clock 210. Once the adjust timeset is obtained, FOWD$_n$ and ROWD$_n$ may be calculated in accordance with the formulas FOWD$_n$=T2'$_n$–T1'$_n$ and ROWD$_n$=T4'$_n$–T3'$_n$. Note that the full timeset may be communicated to the virtual clock located at the reflector node by sending T4 in a following DM packet or by any other means.

Figure 3:
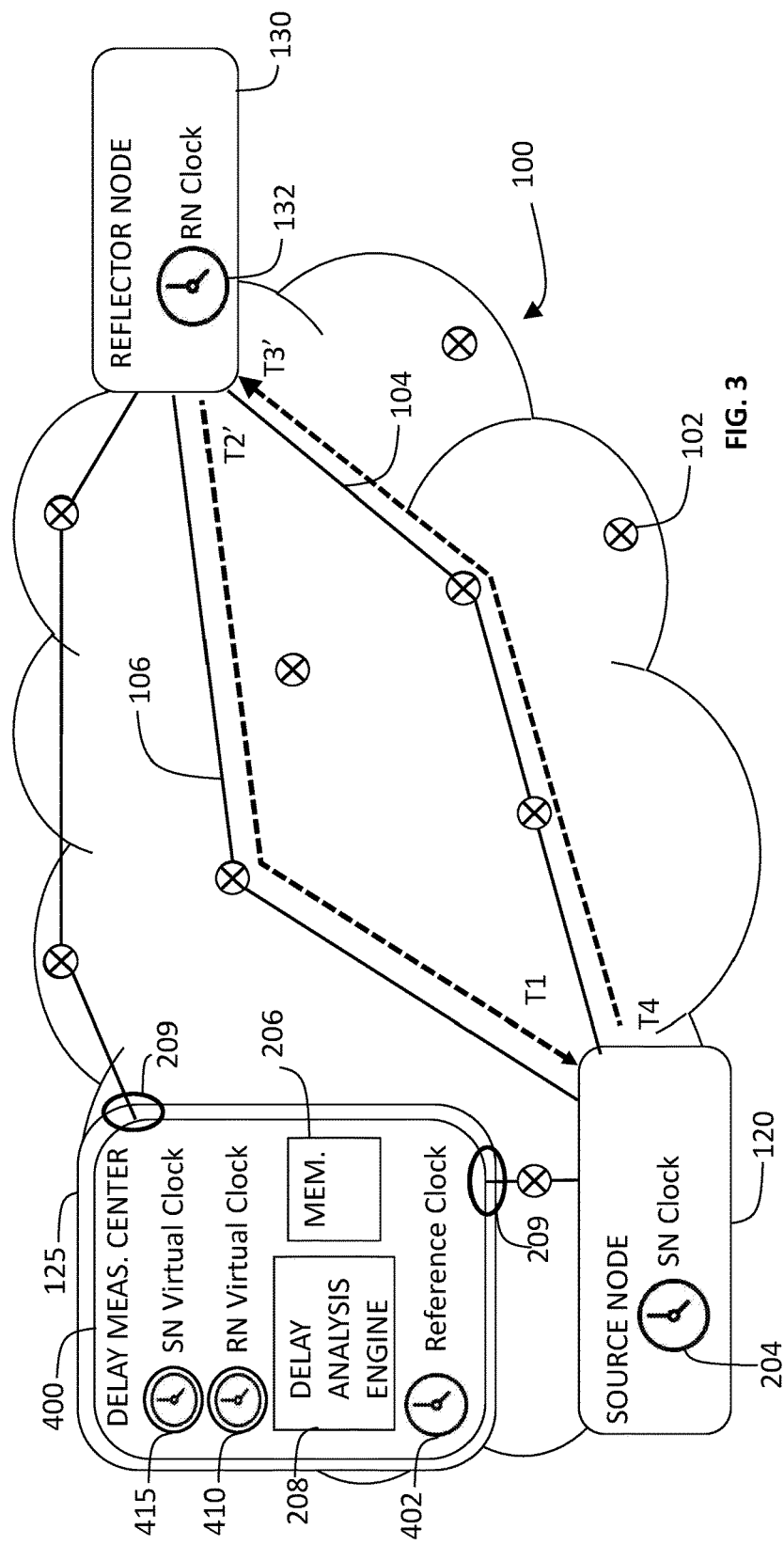
FIG. 3 shows a schematic illustration of DM packet exchange through a communications network between a source node and a reflector node, in accordance with an embodiment of the disclosure wherein virtual clocks are collocated with a reference node.

Alternatively, the DM packet reception and transmission times may be adjusted to be in accordance with a same clock by converting timeset [T1, T2', T3', T4] into an adjusted timeset comprising times [T1", T2", T3", T4"] that are all in accordance with a reference clock (by way of example reference clock 402 as shown in FIG. 3) that is located at a third node that is neither source node 120 nor reflector node 130.

Optionally, the plurality of FOWDs and/or ROWDs, or a selection thereof, are used to calculate one or more of the following statistics: an average (mean, median or mode), a minimum (which may be a floor delay), a maximum, a standard deviation, a skew, a kurtosis, and a percentile histogram. Other statistics may be calculated as needed.

Only a subset of the DM packets transmitted during a session are expected to be lucky packets that experience no queuing delay during their traversal of PSN 100. Generally, a higher number of nodes traversed in a given communication route decreases the number of lucky packets during a session, because each additional node presents an additional chance of the packet experiencing queuing delay. While floor delay values are typically identified by testing round-trip delays against a gating criterion, separately gating FOWD and ROWD advantageously tend to return more lucky packets because fewer nodes are traversed. In a simple case where the probability of traversing a given node with no queuing delay has a value p, then a one-way probability $P_O$ of traversing M nodes in one direction may be calculated as $P_O=p^M$. However, the round trip probability $P_R$ of traversing the same path in both directions (and thus twice as many nodes) without queuing delay may be calculated as $P_R=p^{2M}$, which, given that p has a value between 0 and 1, is exponentially lower than $P_O$. As an illustrative example, if the probability of traversing each node without queuing delay is 10% and there are 4 nodes in each direction, the probability of a minimal FOWD or ROWD is one in ten thousand ($0.1^4=1*10^{-4}$), while the probability of a lucky round trip is one in a hundred million ($1*10^{-8}$).

In NDM procedure 300 in accordance with an embodiment of the invention, the set of FOWD values and ROWD values collected during a DM session are tested against a gating criterion to select FOWD and ROWD values from DM packets presumed to be lucky packets (step 312). Optionally, the gating criterion comprises selecting FOWDs or ROWDs that are within a range above or below a predetermined value. Optionally, the predetermined value comprises a previously determined floor delay (FFD or RFD) estimate and the gating criterion comprises selecting packets with OWDs (FOWDs or ROWDs) that are within a range above or below a previously determined floor delay estimate.

RADM apparatus 200 maintains, optionally in memory 206, an estimated floor delay between source node 120 and reflector node 130 in each direction: an estimated FFD for DM packets transmitted from source node 120 to reflector node 130 and an estimated RFD for DM packets transmitted from reflector node 130 to source node 120. In NDM procedure 300 in accordance with an embodiment of the invention, if a session comprising DM packets includes FOWD and/or ROWD values that pass the gating criterion, the estimated FFD and/or RFD values are updated (block 314). Optionally, one or more gating criterion-passing FOWDs, or an average (mean, median or mode) of a plurality of gating criterion-passing FOWDs, collected during a DM session may be used to calculate a new estimated FFD. Gating criterion-passing ROWDs may be used in the same way to calculate a new estimated RFD. Optionally, the new floor delay estimate is based on the one or more criterion-passing OWDs and a previously calculated floor delay estimate. It will be appreciated that the estimated floor delay may have a value that changes periodically over time, as new gating criterion-passing OWDs are detected, such that delay analysis engine 208 maintains a running estimate of the FFD and/or the RFD. Optionally, OWDs that did not pass the gating criterion may also be used to calculate a new estimated floor delay.

In NDM procedure 300 in accordance to an embodiment of the disclosure, a state of a virtual clock, by way of example reflector node virtual clock 210, may be updated responsive to an updated estimated floor delay (block 316). For the co-routed case, as shown by way of example in FIG. 1, the floor delay is assumed to be independent of direction. Hence, time correction $\Delta t$ may be updated such as to equalize estimates of FFD and RFD. Optionally, $\Delta t$ is updated each a new estimated FFD or RFD is calculated. It will be appreciated that time correction may be $\Delta t$ periodically updated to reflect periodically updating floor delays.

Time correction $\Delta t$ computed based on estimated floor delays may also not remain constant due to respective frequencies of the source node clock and the reflector node clock not being synchronized. In an embodiment of the disclosure, time correction $\Delta t$ may be updated based on an estimated frequency offset $\Delta f$. In a case where frequency offset is constant (clock drift), the frequency offset may be estimated by linear regression, and time correction $\Delta t$ as a given time t, $\Delta t(t)$ may be calculated as $\Delta t(t)=\Delta t(0)+\Delta f\, t$. For more complex behavior of instantaneous frequency, more sophisticated modeling may be employed. The state of the virtual clock comprises a set of all or a combination of any of the parameters thus estimated.

As described above, the updating of the virtual clock state rested on an assumption of equality of FFD and RFD. For the non-co-routed case this assumption cannot be made, and although frequency differences may still be determined, absolute time offsets may not. In such cases it may be possible to find a third node (which may be referred to as a reference node) having co-routed paths to both source and reflector nodes. In an embodiment of the disclosure, if such a reference node exists, then the above NDM procedures may be carried out from the reference node to both source and reflector nodes, thus enabling updating of a state of both a first virtual clock emulating the source clock and a second virtual clock emulating the reflector node clock.

Figure 4:
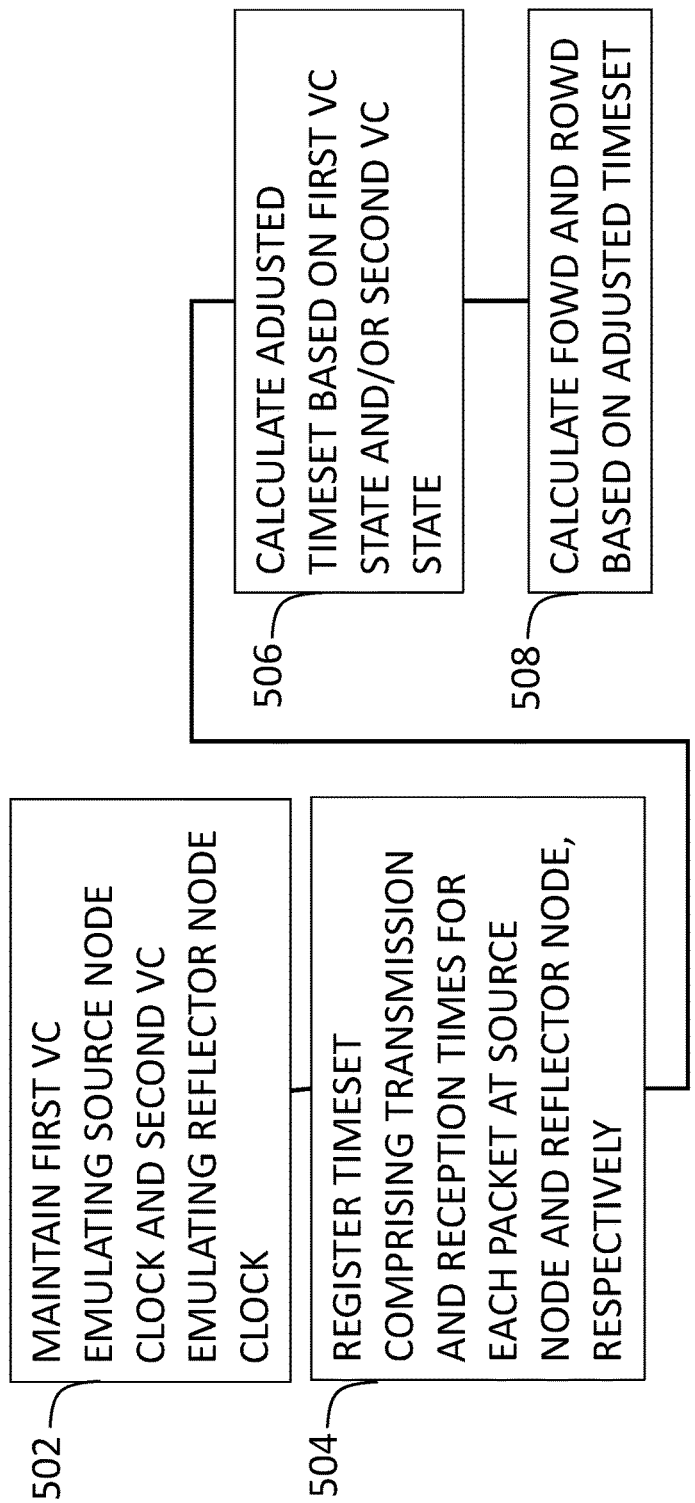
FIG. 4 shows a flowchart showing a method in accordance with an embodiment of the disclosure wherein virtual clocks are collocated with a reference node.

Reference is made to FIG. 3, which schematically illustrates packet switched network (PSN) 100 in DM packets are transmitted between DN 120 and RN 130 in a non-co-routed manner, in which DM packets are transmitted in a forward direction via communication path 104, and DM packets are transmitted in a reverse direction via a different communication path 106. Reference is also made to FIG. 4, which shows a flowchart showing procedure 500 to accurately measure one-way delay of packet transmission between source node 120 and reflector node 130 in accordance of an embodiment of the disclosure.

Network 100 comprises a delay measurement center 200 in accordance with an embodiment of the disclosure that is engaging in a NDM procedure in accordance with an embodiment of the invention. Delay measurement center 400 is located neither at source node 120 nor reflector node 130, but at a reference node 125 with co-routed paths to source node 120 and a reflector node 130. Delay measurement center 400 is similar to RADM apparatus 200 described with reference to FIG. 1, with the exception that delay measurement center 400 comprises at least two virtual clocks, a reflector node virtual clock 410 that emulates a state of reflector node clock 132 located in reflector node 130; and a source node virtual clock 415 that emulates a state of source node clock 204 located in source node 120.

During procedure 500 in accordance with an embodiment of the procedure, delay measurement center 400 maintains a first virtual clock 415 that emulates source node clock 204 and a second virtual clock 410 that emulates RN clock 132 (block 502). In an embodiment of the disclosure, virtual clocks 415 and 410 are maintained by a NDM procedure in accordance with an embodiment of the disclosure. Alternatively or additionally, one of source node clock 204 and reflector node clock 132 are synchronized to the other, or both are synchronized to a common master clock, through a packet-based time distribution protocol. The packet-based time distribution protocol is optionally PTP or NTP.

The timesets of the DM session may be sent to and registered by the reference node (block 504), and the timestamps in the timesets may be converted, responsive to the respective states of first virtual clock 415 and/or second virtual clock 410, into times in accordance with a reference clock comprised in the reference node (block 506). By way of example, a timeset registered by delay measurement center 400 may comprise times [T1, T2', T3', T4], where T1 and T4 were measured in accordance with source node clock 204, and T2' and T3' were measured in accordance with reflector node clock 132. By subtracting a first time correction $\Delta t_1$ comprised in the state of first virtual clock 415 from times T1 and T4 one obtains adjusted times T1" and T4" in accordance with reference clock 402. By subtracting a second time correction $\Delta t_2$ comprised in the state of second virtual clock 410 from times T2' and T3' one obtains adjusted times T2" and T3" in accordance with reference clock 402. As a result, adjusted timeset [T1", T2", T3", T4"] comprises times in accordance with a single node clock, reference clock 402.

With all the times in the timesets thus being in accordance with a same clock, FOWD and ROWD may then be determined as described above (block 508), the determined OWDs may be used to determine an estimated floor delay, and the estimated floor delay may be used to update the state of the first and second virtual clocks, as described above.

In an embodiment of the disclosure, the delay measurement center may maintain more than two virtual clock states emulating more than two node clocks in a network. Optionally, the more than two node clocks includes all node clocks in a network with available co-routed paths to the reference node.

There is therefore provided in accordance with an embodiment of the disclosure a a method for measuring one-way delays in a communications network, the method comprising: transmitting a plurality of packets comprised in a communications session from a first node associated with a first node clock to a second node associated with a second node clock and receiving the plurality of packets after the packets are reflected from the second node back to the first node; maintaining a virtual clock state comprising information for converting times measured with respect to the first and/or second node clock into times as would be measured with respect to a reference clock; registering, for each packet of the plurality of packets in the communications session, a timeset comprising transmission and reception times at the first and second nodes that are measured with respect to the first and second node clocks, respectively; converting, responsive to the virtual clock, times in the timeset measured with respect to the first node clock or the second node clock, into times as would be measured with respect to the reference clock; calculating, for each packet of the series of packets, a forward one-way delay (FOWD) from the first node to the second node and a reverse one-way delay (ROWD) from the second node to the first node, responsive to the converted timeset.

In an embodiment of the disclosure, the method further comprises: testing the FOWD and ROWD of each packet of the series of packets against a gating criterion; updating estimates of forward floor delay (FFD) and reverse floor delay (RFD) responsive to FOWDs and/or ROWDs that pass the gating criterion; and updating the virtual clock state responsive to the updated estimate of FFD and/or RFD.

In an embodiment of the disclosure, the method further comprises recalculating the FOWD and the ROWD of the packets responsive to the updated virtual clock state.

In an embodiment of the disclosure, the reference clock is the first node clock or the second node clock.

In an embodiment of the disclosure, the updating of the virtual clock state is further responsive to FOWD and ROWD of packets that did not pass the gating criterion.

In an embodiment of the disclosure, the method comprises computing at least one one-way delay statistic for the FOWD and/or the ROWD, the at least one one-way delay statistic being selected from the group consisting of: a minimum, a maximum, a standard deviation, a skew, a kurtosis, and a percentile histogram.

In an embodiment of the disclosure, the communications session is a TWAMP session or a Y.1731 session.

There is also provided in accordance with an embodiment of the disclosure a method for measuring one-way delays in a communications network, the method comprising: maintaining, at a third node having a third node clock, a first virtual clock state emulating a first node clock located at a first node and a second virtual clock state emulating a second node clock located at a second node; registering a timeset comprising transmission and reception times at the first node and the second node, respectively, for each packet of a plurality of packets that are transmitted from the first node to the second node and reflected from the second node back to the first node; converting times in the timeset, responsive to the first and/or second virtual clocks, into times in accordance with a reference clock; calculating, for each packet of the plurality of packets, a forward one-way delay (FOWD) from the first node to the second node and a reverse one-way delay (ROWD) from the second node to the first node, responsive to the converted timeset.

In an embodiment of the disclosure, the reference clock is the first node clock, the second node clock, or the third node clock.

In an embodiment of the disclosure, the method computing at least one one-way delay statistic for the FOWD and/or the ROWD, the at least one one-way delay statistic being selected from the group consisting of: a minimum, a maximum, a standard deviation, a skew, a kurtosis, and a percentile histogram.

In an embodiment of the disclosure, the communications session is a TWAMP session or a Y.1731 session.

There is also provided an apparatus for measuring one-way delays in a communications network comprising: a local clock; a memory, at least one virtual clock emulating a node clock located in a remote node; a delay analysis engine operable to: register, for each packet of a plurality of packets comprised in a communications session between a first node collocated with a first node clock and a second node collocated with a second node clock, a timeset comprising transmission and reception times at the first and second nodes that are measured with respect to the first and second node clocks, respectively; convert the times comprised in the timeset to be in accordance with a reference clock responsive to the at least one virtual clock; and calculate for each packet of the plurality of packets, a forward one-way delay (FOWD) from the first node to the second node and a reverse one-way delay (ROWD) from the second node to the first node, responsive to the converted timeset responsive to the converted timeset.

In an embodiment of the disclosure, the apparatus further comprises at least one port for communicating with the communications network.

In an embodiment of the disclosure, the apparatus further comprises a packet source operable to generate and transmit the plurality of packets.

In an embodiment of the disclosure, the delay analysis engine is further operable to determine an estimated FFD and an estimated RFD responsive to the FOWD and the ROWD, respectively.

In an embodiment of the disclosure, the delay analysis engine is further operable to update a state of the at least one virtual clock responsive to the estimated FFD and/or the RFD.

In an embodiment of the disclosure, the reference clock is the first node clock, or a second node clock.

In an embodiment of the disclosure, the apparatus comprises at least two virtual clocks emulating the first and second node clocks, respectively, and the reference clock is a third node clock that is located in a third node.

As used herein, the term "location", "remote", "local", or other terms relating to location may refer to a physical location and/or a logical location.

Descriptions of embodiments of the disclosure in the present application are provided by way of example and are not intended to limit the scope of the disclosure. The described embodiments comprise different features, not all of which are required in all embodiments of the disclosure.

Some embodiments utilize only some of the features or possible combinations of the features. Variations of embodiments of the disclosure that are described, and embodiments of the disclosure comprising different combinations of features noted in the described embodiments, will occur to persons of the art. The scope of the disclosure is limited only by the claims.

The invention claimed is:

1. A method for measuring one-way delays in a communications network, the method comprising:
   maintaining, at a third node having a reference clock, a first virtual clock state emulating a first node clock located at a first node and a second virtual clock state emulating a second node clock located at a second node;
   registering a timeset comprising transmission and reception times at the first node and the second node, respectively, for each packet of a plurality of packets that are transmitted from the first node to the second node and reflected from the second node back to the first node;
   converting times in the timeset, responsive to the first and/or second virtual clocks, into times in accordance with the reference clock;
   calculating, for each packet of the plurality of packets, a forward one-way delay (FOWD) from the first node to the second node and a reverse one-way delay (ROWD) from the second node to the first node, responsive to the converted timeset.

2. The method according to claim 1, further comprising computing at least one one-way delay statistic for the FOWD and/or the ROWD, the at least one one-way delay statistic being selected from the group consisting of: a minimum, a maximum, a standard deviation, a skew, a kurtosis, and a percentile histogram.

3. The method according to claim 1, wherein the delay analysis engine is further operable to determine an estimated forward floor delay (FFD) and an estimated reverse floor delay (RFD) responsive to the FOWD and the ROWD, respectively.

4. The method according to claim 3, the delay analysis engine is further operable to update a state of the at least one virtual clock responsive to the estimated FFD and/or the RFD.

5. The method according to claim 1, wherein the communications session is a conventional DM session and the second node is a standard reflector node conventionally used to determine round-trip time.

6. The method according to claim 1, wherein the communications session is a single communications session.

7. An apparatus for measuring one-way delays in a communications network, the apparatus comprising:
   a first virtual clock emulating a first node clock located in a remote first node and a second virtual clock emulating a second node clock located in a remote second node;
   a reference clock;
   a delay analysis engine operable to:
      register, for each packet of a plurality of packets that are transmitted from the first node to the second node and reflected from the second node back to the first node, a timeset comprising transmission and reception times at the first node and the second node, respectively;
      convert times in the timeset, responsive to the first and/or second virtual clocks, into times in accordance with the reference clock;
      calculate, for each packet of the plurality of packets, a forward one-way delay (FOWD) from the first node to the second node and a reverse one-way delay (ROWD) from the second node to the first node, responsive to the converted timeset.

8. The apparatus according to claim 7, further comprising computing at least one one-way delay statistic for the FOWD and/or the ROWD, the at least one one-way delay statistic being selected from the group consisting of: a minimum, a maximum, a standard deviation, a skew, a kurtosis, and a percentile histogram.

9. The apparatus according to claim 7, wherein the delay analysis engine is further operable to determine an estimated forward floor delay (FFD) and an estimated reverse floor delay (RFD) responsive to the FOWD and the ROWD, respectively.

10. The apparatus according to claim 9, the delay analysis engine is further operable to update a state of the first virtual clock and/or the second virtual clock responsive to the estimated FFD and/or the RFD.

11. The apparatus according to claim 7, wherein the communications session is a conventional DM session and the second node is a standard reflector node conventionally used to determine round-trip time.

12. The apparatus according to claim 7, wherein the communications session is a single communications session.

* * * * *